United States Patent Office 3,554,945
Patented Jan. 12, 1971

3,554,945
LUBRICATING COMPOSITIONS CONTAINING ALKYLATED POLYHYDROXY AROMATIC COMPOUNDS
Harry J. Andress, Jr., Pitman, and Albert L. Williams, Princeton, N.J., assignors to Mobil Oil Corporation, a corporation of New York
No Drawing. Continuation-in-part of application Ser. No. 591,715, Nov. 3, 1966, which is a continuation-in-part of application Ser. No. 355,405, Mar. 27, 1964. This application July 2, 1969, Ser. No. 838,682
Int. Cl. C10m 1/20
U.S. Cl. 252—52     17 Claims

ABSTRACT OF THE DISCLOSURE

The presence of alkylated polyhydroxy benzenoid compounds, preferably of substituted phenols and naphthols, having from 1 to 4 alkyl groups of 6 to 100 carbon atoms, preferably 6 to 30 carbon atoms, and at least 2 hydroxy groups, such compounds being prepared from the appropriate polyhydroxy compound and olefin in the presence of a boron trifluoride catalyst, provide high temperature oxidation protection to lubricating oils and other organic materials.

CROSS REFERENCE TO RELATED APPLICATIONS

This application is a continuation-in-part of U.S. application Ser. No. 591,715, filed Nov. 3, 1966, which in turn is a continuation-in-part of U.S. application Ser. No. 355,405, filed Mar. 27, 1964, both now abandoned.

BACKGROUND OF THE INVENTION

Field of the invention

The invention relates to the inhibition of oxidation in lubricants. More particularly, it relates to such inhibition by adding to the lubricant a small amount of a product prepared from an olefin and a polyhydroxy phenol in the presence of a boron trifluoride-containing catalyst.

Summary of the prior art

It is known that organic compositions, such as lubricating oils, are subject to oxidative deterioration under conditions of modern use. Oxidative deterioration is a particularly severe problem in lubricating modern higher powered engines wherein high temperature operating conditions prevail. As a result of this oxidation, acidic products are formed which exhibit a corrosive effect on metal parts and produce formations of varnish and sludge on engine surfaces thereby lowering the operating efficiency of the engine. With the development of more powerful engines including free piston and gas turbine engines for trucks and autos as well as gas turbine engines for jet aircraft, the need for lubricating compositions possessing good resistance to oxidation at high temperatures has greatly increased.

U.S. 2,831,891 discloses a process for introducing an alkyl substituent into a phenol, such as phenol itself, catechol, resorcinol, or the like, by reacting an olefin with said phenol in the presence of a metal phenoxide catalyst. The products are disclosed as antioxidants for fuels and lubricating oils.

SUMMARY OF THE INVENTION

In accordance with the invention, there is provided a lubricant composition comprising a major proportion of a lubricating oil normally susceptible to oxidative deterioration at elevated temperatures and a minor proportion sufficient to inhibit said deterioration of a reaction product produced by reacting a polyhydroxy benzenoid compound having a nucleus containing from 1 to 7 aromatic rings, said compound having from 2 to 3 hydroxy groups, with an olefin having from about 6 to about 100 carbon atoms, preferably about 6 to about 30 carbon atoms, at a mole ratio of from 1:1 to about 4:1 of olefin to benzenoid compound, in the presence of a boron trifluoride-containing catalyst.

It will be understood that the expression "nucleus having from 1 to 7 aromatic rings" shall mean the nuclei derived from benzene, fused members of from 2 to 7 fused rings, diphenyl and alkylene-bridged diphenyl.

DESCRIPTION OF SPECIFIC EMBODIMENTS

The compounds used in the lubricating compositions of this invention as disclosed above, may be characterized, in general, as benzenoid compounds containing two or three hydroxy groups and from one to four primary or secondary alkyl groups having from 6 to about 100 carbon atoms, preferably about 6 to about 30 carbon atoms, and more preferably at least 12 carbon atoms, attached to the benzenoid nucleus.

These compounds include benzenoid compounds as hereinabove described containing a single benzene ring or more than one benzene ring. The latter type includes both fused ring benzene compounds containing up to 7 and preferably from 2 to 3 fused benzene rings, such as naphthalene, anthracene, naphthacene, pentacene, etc. and compounds containing two benzene rings connected by an alkylene group such as compounds of the formula:

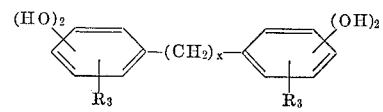

wherein R represents a primary or secondary alkyl as defined above, and $x$ is from 1 to 3.

In order to provide lubricating compositions exhibiting superior oxidation resistance at high temperatures, it is particularly important that the alkyl groups present on the benzenoid nucleus be the primary or secondary alkyl groups. In other words, the alkyl group carbon atom which is immediately adjacent to and directly attached to the benzenoid nucleus should be derived from a primary or secondary carbon atom. These primary and secondary alkyl groups may, however, contain side chain branching and tertiary carbon atoms in other parts of their structure so long as the carbon directly connected to the benzenoid nucleus is derived from a primary or secondary carbon atom.

The alkyl groups present on the benzenoid nucleus may be the same or different. As some examples of suitable alkyls there may be mentioned: hexyl, octyl, decyl, dodecyl, tridecyl, tetradecyl, pentadecyl, hexadecyl, octadecyl, nonadecyl, eiscosyl, tetracosyl, heptacosyl, triacontyl, etc.

A preferred class of antioxidants are the herein described benzenoid compounds containing 2 to 3 hydroxy groups, most preferably 2, and alkyl groups of from 12 to about 30 carbon atoms per group.

The effective high-temperature alkylated polyhydroxy benzenoid compounds herein described are produced by reacting the appropriate polyhydroxy benzenoid compound, i.e., catechol, hydroquinone, resorcinol, pyrogallol, phloroglucinol, dihydroxy naphthalene and the like, with a primary or secondary olefin or olefin mixture in the presence of a boron trifluoride-containing catalyst, such as boron trifluoride etherate. The particular olefin-derived compounds disclosed are believed to be essential for obtaining the surprising stability at the extremely high temperatures ordinarily encountered in jet engine operation.

The reaction products contemplated in this invention are extremely complex mixtures, and their exact nature is not understood. However, it is believed that a substantial amount of product corresponding to the molar ratios of reactants is formed. That is, if 3 moles of hexadecene, for example, are reacted with 1 mole of hydroquinone, at least part of the product is believed to be tri-(2-hexadecyl)-hydroquinone. Keeping in mind that they are merely representative of molar ratios, and are not intended to establish definite compositions, certain structures may be mentioned by way of illustrating some of the compounds contemplated. They are tri-(dodecyl)-2,3-dihydroxy naphthalene, tri-(2-hexadecyl)-catechol, tri-(2-hexadecyl) - hydroquinone, tri-(2-hexadecyl)-pyrogallol, tri-($C_{10}$–$C_{20}$)-pyrogallol, tri-(2-hexadecyl)-phloroglucinol, tetra-($C_{15}$–$C_{20}$)-resorcinol, and bis(tri-(2-hexadecyl)-catechol)-methane.

The alkylene-bridged diphenyl compounds referred to hereinabove are products of the reaction between the alkylated polyhydroxy benzenoid compound with an aldehyde containing from 1 to 3 carbon atoms to produce an alkylene bis-alkylated polyhydroxy benzenoid product. This reaction is known to the art.

The antioxidants used in the lubricating compositions of this invention may have different alkyl groups or combinations of alkyl groups attached to the benzenoid nucleus. For example, the alkylated products prepared using a $C_{15}$–$C_{20}$ mixed olefin fraction are mixtures of different alkylated products, the particular alkyl groups attached to the benzenoid nucleus being, in general dependent on the relative proportions of the different olefins in this olefin mixture.

In accordance with the present invention, it has been found that the above-described alkylated polyhydroxy benzenoid compounds are surprisingly effective antioxidants at elevated temperatures such as temperatures from about 500° F. upwards, particularly elevated temperatures in the range from about 500° F. to about 800° F. The effectiveness of the instant antioxidants in lubricating compositions at high temperatures is in distinct contrast to the behavior of known antioxidants such as diisopropyl catechol and tertiary butyl catechols. These known materials which contain short chain tertiary alkyl groups are distinctly inferior antioxidants under such conditions.

That the alkylated polyhydroxy benzenoid compounds hereinabove-described are capable of functioning as effective antioxidants at high temperatures is quite unexpected, since these same compounds exhibit little, or at best poor, antioxidant properties under lower temperature conditions. Indeed, as will be shown hereinafter, the low temperature antioxidant properties of the instant compounds are inferior to those of present commercially available antioxidants such as phenyl-α-naphthylamine. At elevated temperatures, however, i.e., temperatures of from 500° F. upwards, the instant benzenoid compounds exhibit superior antioxidant characteristics.

The amount of the alkylated polyhydroxy benzenoid compounds which should be used in order to improve the high temperature oxidation resistance of lubricating compositions will depend on various factors such as the nature of the lubricating compositions, the presence or absence of other additives, etc. In general, an amount ranging from about 0.1% to about 10%, preferably from about 1.0% to about 5.0% by weight may be employed.

Further details regarding the invention will be apparent from the following specific embodiments.

EXAMPLE 1

A mixture of 143 grams (1.3 moles) catechol, 874 grams (3.9 moles) 1-hexadecene, and 40 grams boron trifluoride ethyletherate was stirred at 85–90° C. for about 12 hours. The reaction mixture was then washed with hot distilled water until the washings were neutral to litmus paper. Topping at 225° C. under reduced pressure gave the final product.

EXAMPLE 2

A mixture of 55 grams (0.5 mole) hydroquinone, 336 grams (1.5 moles) 1-hexadecene, and 25 grams boron trifluoride ethyletherate as stirred at 95° C. for about 12 hours. The reaction was washed with hot distilled water until the washings were neutral to litmus paper. The final product was obtained by topping at 235° C. under reduced pressure.

EXAMPLE 3

A mixture of 44 grams (0.4 mole) resorcinol, 387 grams (1.6 moles) of a ($C_{15}$–$C_{20}$) mixed 1-olefin fraction comprising 12% 1-pentadecene, 22% 1-hexadecene, 20% 1-heptadecene, 19% 1-octadecene, 17% 1-nonadecene, 10% 1-eicosens (and averaging about 242 molecular weight), and 35 grams boron trifluoride ethyletherate was stirred at 95° C. for about 10 hours. The reaction mixture was washed with hot distilled water until the washings were neutral to litmus. The final product was obtained by topping at 230° C. under pressure.

EXAMPLE 4

A mixture of 126 grams (1.0 mole) pyrogallol, 672 grams (3.0 mole) 1-hexadecene, and 50 grams boron trifluoride ethyletherate was stirred at 90–95° C. for about 16 hours. The reaction mixture was then washed with hot distilled water until the washings were neutral to litmus. The final product was obtained by topping at 230° C. under reduced pressure.

EXAMPLE 5

A mixture of 38 grams (0.24 mole) phloroglucinol dihydrate and 158 grams (0.72 mole) 1-hexadecene was heated to 160° C. and blown with nitrogen to remove water of hydration from the phloroglucinol. The mixture was cooled to 80° C. and 30 grams boron trifluoride ethyletherate was added and stirred at 95° C. for about 12 hours. The reaction mixture was then water washed with hot distilled water until the washings were neutral to litmus. The final product was obtained by topping at 235° C. under reduced pressure.

EXAMPLE 6

A product produced in a manner similar to that of Example 1, was reacted with formaldehyde at an elevated temperature in amounts sufficient to yield the methylene-bridged product. The temperature reached about 150° C.

EXAMPLE 7

A mixture of 110 grams (1 mole) of catechol, 280 grams (2 moles) 1-decene, and 30 grams of boron trifluoride ethyletherate was stirred at 90–95° C. for about 12 hours. The reaction mixture was then washed with hot distilled water until neutral to litmus paper. Topping at 240° C. at 100 mm. pressure gave the final product.

EXAMPLE 8

A mixture of 110 grams (1 mole) hydroquinone, 336 grams (2 moles) 1-dodecene, and 40 grams boron trifluoride ethyletherate was stirred at 95–100° C. for about 6 hours. The reaction mixture was then washed with hot distilled water until neutral to litmus paper. Topping at 208° C. at 0.05 mm. pressure gave the final product.

EXAMPLE 9

A mixture of 100 grams (0.8 mole) pyrogallol, 314 grams (1.6 moles) 1 - tetradecene, and 30 grams boron trifluoride ethyletherate was stirred at 90–95° C. for about 8 hours. The reaction mixture was then washed with hot distilled water until neutral to litmus paper. Topping at 200° C. at 0.05 mm. pressure gave the final product.

EXAMPLE 10

A mixture of 110 grams (1 mole) resorcinol, 504 grams (2 moles) 1-octadecene, and 35 grams boron trifluoride ethyletherate was stirred at 85–90° C. for 10 hours. The reaction mixture was then washed with hot distilled water until neutral to litmus paper. Topping at 210° C. at 50 mm. pressure gave the final product.

EXAMPLE 11

A mixture of 55 grams (0.5 mole) hydroquinone, 350 grams (1 mole) of a 1-olefin fraction (analyzing 14% $C_{20}$ 1-olefin, 43% $C_{22}$ 1-olefin, 23% $C_{24}$ 1-olefin, 11% $C_{26}$ 1-olefin, 5% $C_{28}$ 1-olefin, and 5% $C_{30}$ and above 1-olefins), and 45 grams boron trifluoride ethyletherate was stirred at 90–95° C. for about 8 hours and at 105–110° C. for an additional 8 hours. The reaction mixture was then washed with hot distilled water until neutral to litmus paper. Topping at 205° C. at 0.05 mm. pressure gave the final product.

mal equilibrium is established, the sample tube is connected with the closed oxygen circulating system. Oxygen is circulated through a fritted glass disc near the bottom of the sample tube at a rate of 5 liters per hour. The time required for the absorption of 50 millimoles of oxygen per 100 grams of sample is taken as the induction period. The longer the induction period the greater is the oxidative resistance of the oil sample. The appearance of the disc and the presence of deposits, etc., are also reported.

The results are reported in the following Table I. The alkylated compounds named therein are indicative of molar ratios of olefin and phenol.

TABLE I.—BULK OIL TEST AT 300° F.

| Test No: | Base oil | Antioxidant | Millimoles per kg. oil | Wt. percent | Hours for absorption of 0.5 mole of $O_2$ per kg. of sample | Cleanliness |
|---|---|---|---|---|---|---|
| 1 | White oil [1] | None | | | 0.9 | Clean. |
| 2 | do | Catechol | 9 | 0.1 | 5.2 | Black deposits. |
| 3 | do | Tri-(2-hexadecyl)-catechol | 9 | 0.711 | 9.6 | Clean. |
| 4 | do | Hydroquinone | 9 | 0.1 | 2.4 | Black deposits. |
| 5 | do | Tri-(2-hexadecyl)-hydroquinone | 9 | 0.711 | 7.2 | Clean. |
| 6 | do | Pyrogallol | 8 | 0.1 | 9.8 | Black deposits. |
| 7 | do | Tri-(2-hexadecyl)-pyrogallol | 8 | 0.633 | 9.1 | Clean. |
| 8 | do | Phenyl-α-naphthylamine | 4.6 | 0.1 | 55.0 | Do. |

[1] KV at 210° F.=8 cs.

EXAMPLE 12

A mixture of 80 grams (0.5 mole) 2,7 - dihydroxy naphthalene, 216 grams (1.1 mole) 1 - tetradecene, and 30 grams boron trifluoride ethyletherate, was stirred at 90–95° C. for 12 hours. The reaction mixture was then washed with hot distilled water until neutral to litmus paper. Topping at 220° C. at 0.05 mm. pressure gave the final product.

EXAMPLE 13

A mixture of 87 grams (0.55 mole) 2,3 - dihydroxy naphthalene, 216 grams (1.1 mole 1 - tetradecene, and 30 grams boron trifluoride ethyletherate was stirred at 95° C. for 6 hours. The reaction mixture was then washed with hot distilled water until neutral to litmus paper. Topping at 220° C. at 0.05 mm. pressure gave the final product.

EXAMPLE 14

A mixture of 100 grams (0.54 mole) o,o'-biphenol, 211 grams (1.08 moles) 1-tetradecene, and 30 grams boron trifluoride ethyletherate was stirred at 95° C. for six hours. The reaction mixture was washed with hot distilled water until neutral to litmus paper. Topping at 215° C. at 0.05 mm. pressure gave the final product.

In order to demonstrate that the superior high temperature antioxidant properties of the instant alkylated polyhydroxy benzenoid compounds are quite unexpected in view of their poor antioxidant properties at lower temperatures, the instant compounds, their non-alkylated polyhydroxy parent compounds, and known anti-oxidants were added to oil samples which were subjected to two oxidation tests. The Bulk Oil Oxidation Test was conducted at 300° F. and the Thin Film Oxidation Test at 575° F.

BULK OIL OXIDATION TEST

In general, this test is employed to determine the low temperature antioxidant capability in lubricating oils of the additives tested.

Briefly, this test is conducted in an oxygen circulation apparatus of the type described by Dornte in Ind. Eng. Chem., 28, pp. 26–30 (1936) modified so that the rate of oxygen absorption can be recorded automatically. In general, a tube containing an oil sample and additive is placed in a heater thermostatted at 300° F. After ther- It will be seen from Table I that the instant alkylated polyhydroxy benzenoid compounds, which were compared with and used in the same molar proportions as their corresponding nonalkylated polyhydroxy parent compounds increased the lower temperature oxidation resistance only slightly. In any case, it was seen that the instant compounds are poor antioxidants at these low temperature conditions when compared to a commercial antioxidant such as phenyl-α-napthylamine (PAN), since the oil composition containing PAN possessed an induction period of 55.0 hours compared to the less than 10 hour periods secured with the instant alkylated compounds.

THIN FILM OXIDATION TEST

This test measures the antioxidant capability of additives in lubricating oils at high temperature.

According to the test, each additive is dissolved in a white oil (k.v. at 210° F.=8 cs.) at 0.035 mole per kg. of blend. The oil sample is pumped through a preheater, where it is heated to the test temperature, into a closed oxidation chamber where the oil is brought into contact with heated pure aluminum disc spinning at 2500 r.p.m. The contact time of the oil on the disc is about one second. The oxidation chamber is a closed system. A pump continuously circulates air through the oxidation chamber where the oil is oxidized in a thin film on the spinning disc. The oxygen consumed is replaced continuously and automatically from an oxygen reservoir. Upon leaving the disc, the oxidation of the oil is stopped by passing it through a water jacket held at 90° F. After ten passes over the disc, the test is stopped and the deposits on the disc are measured.

The rate at which oxygen is continuously introduced into the system is a direct measure of the oxidation rate of the oil sample. In general, an oil consuming less than 40 ml. of oxygen per 5 minutes is regarded as well stabilized. Further details as to the test procedures are described in ASLE Transactions, 7, No. 1, 64–72 (1964).

The results of this test at 575° F. and 625° F. are reported in Tables II and III, respectively. Again it will be understood that the use of the compound name merely denotes the molar ratio of olefin and phenol used.

The nonalkylated polyhydroxy compounds corresponding to the instant alkylated products, i.e., catechol, hydroquinone, resorcinol, pyrogallol and phloroglucinol could not be tested because of their very low solubility in the hydrocarbon oil.

TABLE II.—THIN FILM OXIDATION TEST AT 575° F.

| Test No. | Base oil | Antioxidant | Millimoles per kg. oil | Wt. percent | Oxygen uptake (ml. O₂ per 5 min.) | Lacquer on disc |
|---|---|---|---|---|---|---|
| 1 | White oil [1] | None | | | >500 | |
| 2 | do | 3,5 Di-isopropylcatechol | 35 | 0.68 | 200 | Medium. |
| 3 | do | 4-Tert-butyl catechol | 35 | 0.58 | 130 | Light. |
| 4 | do | Tri-(2-hexadecyl)-catechol | 9 | 0.68 | 10 | Very light. |
| 5 | do | Tri (2-hexadecyl)-hydroquinone | 35 | [2] 2.7 | 20 | None. |
| 6 | do | Tetra-(C₁₅–C₃₀)-resorcinol | 35 | 3.7 | 20 | Do. |
| 7 | do | Tri-(2-hexadecyl)-pyrogallol | 35 | [2] 2.8 | 30 | Very light. |
| 8 | do | Tri-(2-hexadecyl)-phloroglucinol | 35 | 2.3 | 30 | Do. |
| 9 | do | Didecyl catechol | | [2] 3.0 | 17 | Do. |
| 10 | do | Didodecyl hydroquinone | | [2] 3.0 | 0 | Trace. |
| 11 | do | Ditetradecylpyrogallol | | [2] 3.0 | 2.5 | Do. |
| 12 | do | Dioctadecyl resorcinol | | [2] 3.0 | 18 | Do. |
| 13 | do | Dialkyl-(C₂₀–C₃₀+)-hydroquinone | | [2] 3.0 | 0 | Do. |
| 14 | do | Detetradecyl 2,7-dihydroxy naphthalene | | [2] 3.0 | 12 | Do. |
| 15 | do | Ditetradecyl 2,3-dihydroxy naphthalene | | [2] 3.0 | 0 | Do. |
| 16 | do | Ditetradecyl o,o′-biphenol | | [2] 3.0 | 55 | Do. |
| 17 | do | Methylene bis-[tri-(2-hexadecyl)-catechol] | 35 | [2] 2.7 | 20 | Very light. |
| 18 | do | Tri-(2-hexyl)-catechol | 35 | 1.16 | 20 | Light. |
| 19 | do | Phenyl-α-naphthylamine | 35 | 0.76 | 200 | Very light. |
| 20 | do | 4,4′-methylene bis-(2,6-ditert.butyl phenol) | 35 | 2.75 | 220 | Do. |
| 21 | do | Tri-(C₁₅–C₁₈)-phenol | 35 | 2.2 | 330 | Light. |

[1] KV at 210° F.=8 cs.
[2] Tests are at 600° F.

TABLE III.—THIN FILM OXIDATION TEST AT 625° F.

| Test No. | Base oil | Antioxidant | Millimoles per kg. oil | Wt. percent | Oxygen uptake (ml. O₂ per 5 min.) | Lacquer on disc |
|---|---|---|---|---|---|---|
| 1 | White oil [1] | None | | | >500 | |
| 2 | do | Tri-(2-hexadecyl)-catechol | 9 | 2.7 | 40 | Very light. |
| 3 | do | Tri-(2-hexadecyl)-hydroquinone | 9 | 2.7 | 40 | Do. |
| 4 | do | Tri-(2-hexadecyl)-pyrogallol | 9 | 2.8 | 40 | Do. |
| 5 | Synthetic ester oil [2] | Tri-(2-hexadecyl)-catechol | 9 | 2.7 | 30 | Do. |
| 6 | Synthetic ester [2] | Catechol | 9 | 0.38 | 170 | Light-medium. |

[1] KV at 210° F.=8 cs.
[2] A commercial pentaerythritol ester lube.

Based on the results reported in Tables II and III, it will be seen that the present alkylated polyhydroxy benzenoid compounds are extremely effective high temperature antioxidants. More particularly, it is noted that while alkylated catechols containing one and two tertiary alkyl groups of less than 6 carbons (Tests 2 and 3, Table II) possess poor high temperature antioxidant properties as evidenced by their oxygen uptakes of 200 and 130 (ml. O₂ per 5 minutes); the present alkylated compounds which contain primary or secondary alkyl groups of at least 6 carbons, exhibit surprising high temperature antioxidant properties as evidenced by the oxygen uptakes of 30 or less. These superior comparative results are achieved even when significantly less molar proportions of the instant antioxidants are employed. This will be seen from Test 4, Table II, wherein only 9 millimoles of the instant antioxidant were used and an extremely low oxygen uptake of 10 was obtained. It is further seen from Table II that the instant antioxidants are superior to the commercially used phenylnaphthylamine and 4,4′-methylene bis-(2,6-di-tert.butyl phenol) (Tests 19 and 20, respectively), and to a phenol (Test 21).

The alkylated polyhydroxy benzenoid compounds of the invention may be employed to improve the oxidation stability at elevated temperatures of a variety of lubricating oils of different origin and characteristics. Such lubricating oils include both mineral oils as well as synthetic oils such as synthetic esters, synthetic hydrocarbons, silicones, etc. Mineral oils include oils obtained from different crudes, either naphthenic, paraffinic, mixed base, etc., either solvent and acid refined, hydrocracked, etc. Synthetic oils include alkylene polymers such as polymers of propylene, butylene, etc., alkylene oxide polymers, di-carboxylic acid esters, liquid esters of phosphorus, polypropylene glycol, di-(2-ethyl hexyl)-sebacate, di-(2-ethyl hexyl)-adipate, esters of pentaerythritol, neopentyl glycol, polyalkyl silicone polymers, etc. In general, the antioxidants of this invention may be advantageously used in various lubricating compositions, such as automobile lubricants, marine oils, hydraulic fluids, industrial lubricants, etc., which may require good oxidation resistance at elevated temperatures. The instant antioxidants are particularly suitable for use in gas turbine engines such as jet engines for aircraft etc. Other organic base media include heat exchange fluids, power transmission fluids, polyolefinic polymers in the form of molded, cast or extruded shapes, or coatings, such as derived from polyethylene, polybutene, polybutadiene, polyvinyl products, natural or synthetic elastomers, and the like.

The organic compositions of the present invention may, of course, also contain effective quantities of various typical additives normally used in such compositions such as detergents, rust inhibitors, pour point improvers, V.I. improvers, supplemental antioxidants and the like.

It will be appreciated that many variations and modifications can be practiced without departing from the spirit and scope of the present invention.

Having thus described the present invention, what we desire to secure by Letters Patent is:

1. A lubricant composition comprising a major proportion of a lubricating oil normally susceptible to oxidative deterioration at elevated temperatures and a minor proportion sufficient to inhibit said deterioration of the reaction product produced by reacting a compound having 2 to 3 hydroxy groups attached to the ring whose nucleus is selected from the group consisting of benzene, fused members thereof having from 2 to 7 fused rings, diphenyl and alkylene-bridged diphenyl, with an olefin having from about 6 to about 100 carbon atoms, at a mole ratio of from about 1:1 to about 4:1 of olefin to compound, in the presence of a boron trifluoride-containing catalyst, the alkyl attached to the ring of said reaction product being primary or secondary.

2. The composition of claim 1 wherein the said compound contains 1 aromatic ring.

3. The composition of claim 2 wherein the said compound is selected from the group consisting of catechol, resorcinol, hydroquinone, pyrogallol, and phloroglucinol.

4. The composition of claim 2 wherein the said compound is catechol.

5. The composition of claim 1 wherein the said olefin contains from about 6 to about 30 carbon atoms.

6. The composition of claim 1 wherein the olefin contains at least 12 carbon atoms.

7. The composition of claim 6 wherein the olefin contains from about 12 to about 30 carbon atoms.

8. The composition of claim 7 wherein the olefin is hexadecene.

9. The composition of claim 5 wherein the olefin is a mixture of olefins.

10. The composition of claim 9 wherein the olefins contain 15 to 20 carbon atoms.

11. An organic liquid composition comprising a major proportion of an organic liquid which is normally susceptible to high temperature oxidative deterioration and a minor proportion of a product of a reaction between the reaction product of claim 1 and an aldehyde having from 1 to 3 carbon atoms.

12. The composition of claim 11 wherein the aldehyde is formaldehyde.

13. The composition of claim 1 wherein hexadecene is reacted with catechol at a mole ratio of 3:1.

14. The composition of claim 1 wherein said reaction product is produced by reacting hexadecene with catechol in a molar ratio of 3 to 1.

15. The composition of claim 1 wherein the said reaction product is produced by reacting hexadecene and hydroquinone in a molar ratio of 3 to 1.

16. The composition of claim 11 wherein the said reaction product is produced by reacting hexadecene and catechol in a molar ratio of 3:1.

17. A lubricant composition comprising a major proportion of a lubricating oil normally susceptible to oxidative deterioration at elevated temperatures and a minor proportion sufficient to inhibit said deterioration of the reaction product produced by reacting a compound having 2 to 3 hydroxy groups whose nucleus is selected from the group consisting of benzene, fused members thereof having from 2 to 7 fused rings, diphenyl and alkylene-bridged diphenyl, with an olefin having from about 6 to about 100 carbon atoms in the presence of a boron trifluoride-containing catalyst, said reaction product containing from 1 to 4 primary or secondary alkyl groups after reaction with said olefin, the alkyl groups being attached to the ring of said reaction product.

References Cited

UNITED STATES PATENTS

| | | | |
|---|---|---|---|
| 2,194,312 | 3/1940 | Loane | 252—52 |
| 2,202,877 | 6/1940 | Stevens et al. | 252—52X |
| 2,623,855 | 12/1952 | Garner | 252—52X |
| 2,732,300 | 1/1956 | Thirtle et al. | 260—625X |
| 2,831,898 | 4/1958 | Ecke et al. | 252—52X |
| 2,874,193 | 2/1959 | Dijkstra | 260—625X |
| 2,881,219 | 4/1959 | Thompson | 252—404X |
| 3,071,595 | 1/1963 | Vesely et al. | 260—625X |
| 3,095,287 | 1/1963 | Coffield et al. | 252—52X |
| 3,221,060 | 1/1965 | Albert et al. | 252—404 |
| 3,424,821 | 1/1969 | Hunter | 260—625X |

PATRICK P. GARVIN, Primary Examiner

W. H. CANNON, Assistant Examiner

U.S. Cl. X.R.

252—73, 404; 44—78; 260—45.95

PO-1050
(5/69)

UNITED STATES PATENT OFFICE
CERTIFICATE OF CORRECTION

Patent No. 3,554,945  Dated January 12, 1971

Inventor(s) Harry J. Andress, Jr. and Albert L. Williams

It is certified that error appears in the above-identified patent and that said Letters Patent are hereby corrected as shown below:

In column 5, line 32, "216 grams (1.1 mole)" should be -- 196 grams (1 mole) --. In column 7, Table II, Test No. 14, "Detetradecyl" should be -- Ditetradecyl --. In column 7, Table II, Test No. 21, "Tri-$(C_{15}-C_{15})$" should be -- Tri-$(C_{11}-C_{15})$ --.

Signed and sealed this 22nd day of June 1971.

(SEAL)
Attest:

EDWARD M. FLETCHER, JR.
Attesting Officer

WILLIAM E. SCHUYLER,
Commissioner of Patent